United States Patent
Binford, III et al.

(10) Patent No.: US 6,697,094 B2
(45) Date of Patent: Feb. 24, 2004

(54) METHOD AND APPARATUS FOR LOCATING THE PROCESS POSTION OF A SCAN LINE IN AN ELECTROPHOTOGRAPHIC MACHINE

(75) Inventors: Joseph Ladd Binford, III, Lexington, KY (US); Christopher Gregory Chee, Lexington, KY (US); Wilson Morgan Routt, Jr., Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 24 days.

(21) Appl. No.: 09/854,591

(22) Filed: May 14, 2001

(65) Prior Publication Data

US 2002/0167583 A1 Nov. 14, 2002

(51) Int. Cl.⁷ .................................. B41J 2/435
(52) U.S. Cl. ...................... 347/234; 347/248
(58) Field of Search .................. 347/234, 241, 347/248, 256; 250/234, 235, 201.5; 359/216; 369/97

(56) References Cited

U.S. PATENT DOCUMENTS

| | | | |
|---|---|---|---|
| 4,206,348 A | 6/1980 | Davy et al. | 250/201.1 |
| 4,270,131 A | 5/1981 | Tompkins et al. | 347/250 |
| 4,569,584 A | 2/1986 | St. John et al. | 399/301 |
| 4,672,188 A * | 6/1987 | Cohen | 250/201.5 |
| 4,686,363 A | 8/1987 | Schoon | 250/235 |
| 4,764,672 A | 8/1988 | Wu et al. | 250/236 |
| 4,823,151 A | 4/1989 | Miura | 347/235 |
| 4,845,358 A | 7/1989 | Asada | 250/235 |
| 4,903,067 A | 2/1990 | Murayama et al. | 347/129 |
| 4,933,549 A * | 6/1990 | Fujioka et al. | 250/235 |
| 5,072,244 A | 12/1991 | Aoki et al. | 347/116 |
| 5,115,256 A | 5/1992 | Miyagi et al. | 347/249 |
| 5,208,796 A * | 5/1993 | Wong et al. | 369/97 |
| 5,260,725 A | 11/1993 | Hammond | 347/132 |
| 5,272,493 A | 12/1993 | Hubble, III et al. | 347/116 |
| 5,291,273 A | 3/1994 | Gelbart | 356/635 |
| 5,302,973 A | 4/1994 | Costanza et al. | 347/233 |
| 5,319,444 A | 6/1994 | Saitoh et al. | 356/401 |
| 5,319,537 A | 6/1994 | Powers et al. | 347/232 |
| 5,351,264 A | 9/1994 | Kato et al. | 372/107 |
| 5,381,167 A | 1/1995 | Fujii et al. | 347/116 |
| 5,384,592 A | 1/1995 | Wong | 347/116 |
| 5,442,171 A * | 8/1995 | Anzai | 250/235 |
| 5,452,073 A | 9/1995 | Kataoka | 399/299 |
| 5,457,487 A | 10/1995 | Sakaki et al. | 347/116 |
| 5,465,154 A | 11/1995 | Levy | 356/632 |
| 5,477,330 A | 12/1995 | Dorr | 358/296 |
| 5,525,809 A | 6/1996 | Bolea | 250/559.27 |
| 5,530,242 A | 6/1996 | Genovese | 250/254 |
| 5,583,557 A | 12/1996 | Yamamoto et al. | 347/235 |
| 5,677,726 A | 10/1997 | Fuse | 347/260 |
| 5,694,637 A | 12/1997 | Yoshino et al. | 399/38 |
| 5,737,003 A | 4/1998 | Moe et al. | 347/116 |
| 5,745,154 A | 4/1998 | Nishizawa | 347/250 |
| 5,754,690 A | 5/1998 | Jackson et al. | 382/199 |

(List continued on next page.)

FOREIGN PATENT DOCUMENTS

JP          10-117042      *   5/1998   ............ H01S/3/18

Primary Examiner—Hai Pham
(74) Attorney, Agent, or Firm—Taylor & Aust, P.C.; John A. Brady

(57) ABSTRACT

A laser beam sensor assembly in an electrophotographic machine includes a sensor device detecting a position of a laser beam in a process direction. The sensor device has a detection range in the process direction. The sensor device has at least one slot or at least one projection. A fixed structure has an other of the at least one slot and the at least one projection. The at least one slot and the at least one projection coact to allow the sensor device to slide in the process direction to a location such that the laser beam is at a desired position within the detection range of the sensor device.

16 Claims, 3 Drawing Sheets

U.S. PATENT DOCUMENTS

| | | | |
|---|---|---|---|
| 5,786,594 A | * 7/1998 | Ito et al. | 250/236 |
| 5,790,255 A | 8/1998 | Jackson et al. | 356/622 |
| 5,864,127 A | 1/1999 | Jackson et al. | 235/454 |
| 5,864,404 A | 1/1999 | Amorosi | 356/627 |
| 5,963,356 A | * 10/1999 | Kato | 359/216 |
| 5,969,346 A | * 10/1999 | Nagasaka et al. | 250/234 |
| 5,982,402 A | 11/1999 | Yoshikawa et al. | 347/116 |

* cited by examiner

METHOD AND APPARATUS FOR LOCATING THE PROCESS POSTION OF A SCAN LINE IN AN ELECTROPHOTOGRAPHIC MACHINE

BACKGROUND OF THE INVENTION

1. Field of the Invention

The present invention relates to an electrophotographic machine, and, more particularly, to a method and apparatus for determining a position of a laser beam in an electrophotographic machine, such as a laser printer.

2. Description of the Related Art

In an in-line color laser image printing process, the print medium typically passes through four color developing stations in series, with the colors being black, magenta, cyan and yellow. In order for the multi-color laser printer to print at the same speed as a monochrome laser printer, photoconductive drum exposures must occur for all four colors simultaneously. Thus, alignment of the four color developing stations in both the process direction (feed direction of the print medium) and scan direction (across the page) is critical.

The process location of each scanning laser beam must overlap to prevent color misregistration in the process direction. Each color must have an adjustment to correct for process direction misalignment because each color has a scanning laser beam following a separate optical path. Although the laser beams can be aligned when the laser printer is first assembled, thermal changes occurring during operation of the laser printer can cause subsequent misalignment of the laser beams.

It is known to use a horizontal synchronization (HSYNC) sensor to determine the location of the start of the scan of the laser beam across the photoconductive drum. The HSYNC sensor has a rectangular photosensitive surface which is placed somewhere in the laser print head near the start of a scan line. When the laser beam strikes the HSYNC sensor surface at the start of a scan line, the photodiode sensor detects the presence of the laser beam and thereby identifies, the location of the laser beam. Such rectangular sensors, however, cannot be used to determine a location of the laser beam in the process direction.

What is needed in the art is a low-cost method of aligning multiple laser beams in a process direction of a laser printer such that all of the laser beams can operate simultaneously to thereby achieve the same printing speed as that of a monochrome laser printer.

SUMMARY OF THE INVENTION

The present invention provides a method of real time detection of process direction location of multiple scan lines of a multicolor electrophotographic machine, such as a laser printer.

In one embodiment of the method of the present invention, an aperture over a standard photodiode is used to generate timing pulses proportional to the process position. In this case, a lens only functions to collect the light onto the photodiode detector, not to maintain process direction information fidelity. In another embodiment, the aperture or mask is applied directly to the photodiode, a subassembly adjustment is used, and the lens is eliminated altogether. In addition, a subassembly adjustment can be used with a position sensitive device (PSD) sensor without a lens.

The invention comprises, in one form thereof, a laser beam sensor assembly in an electrophotographic machine. A sensor device detects a position of a laser beam in a process direction. The sensor device has a detection range in the process direction. The sensor device has at least one slot or at least one projection. A fixed structure has an other of the at least one slot and the at least one projection. The at least one slot and the at least one projection coact to allow the sensor device to slide in the process direction to a location such that the laser beam is at a desired position within the detection range of the sensor device.

The invention comprises, in another form thereof, a method of detecting a change in a position of a laser beam in a process direction in an electrophotographic machine. The method includes providing a sensor to detect the position of the laser beam in the process direction. The sensor has a detection range in the process direction. The position of the laser beam in the process direction relative to the detection range of the sensor is detected. The sensor is moved in the process direction until the laser beam is at a desired position within the detection range of the sensor. The position of the laser beam in the process direction is monitored. The monitoring is performed using the sensor.

An advantage of the present invention is that laser beam drift in the process direction can be detected.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
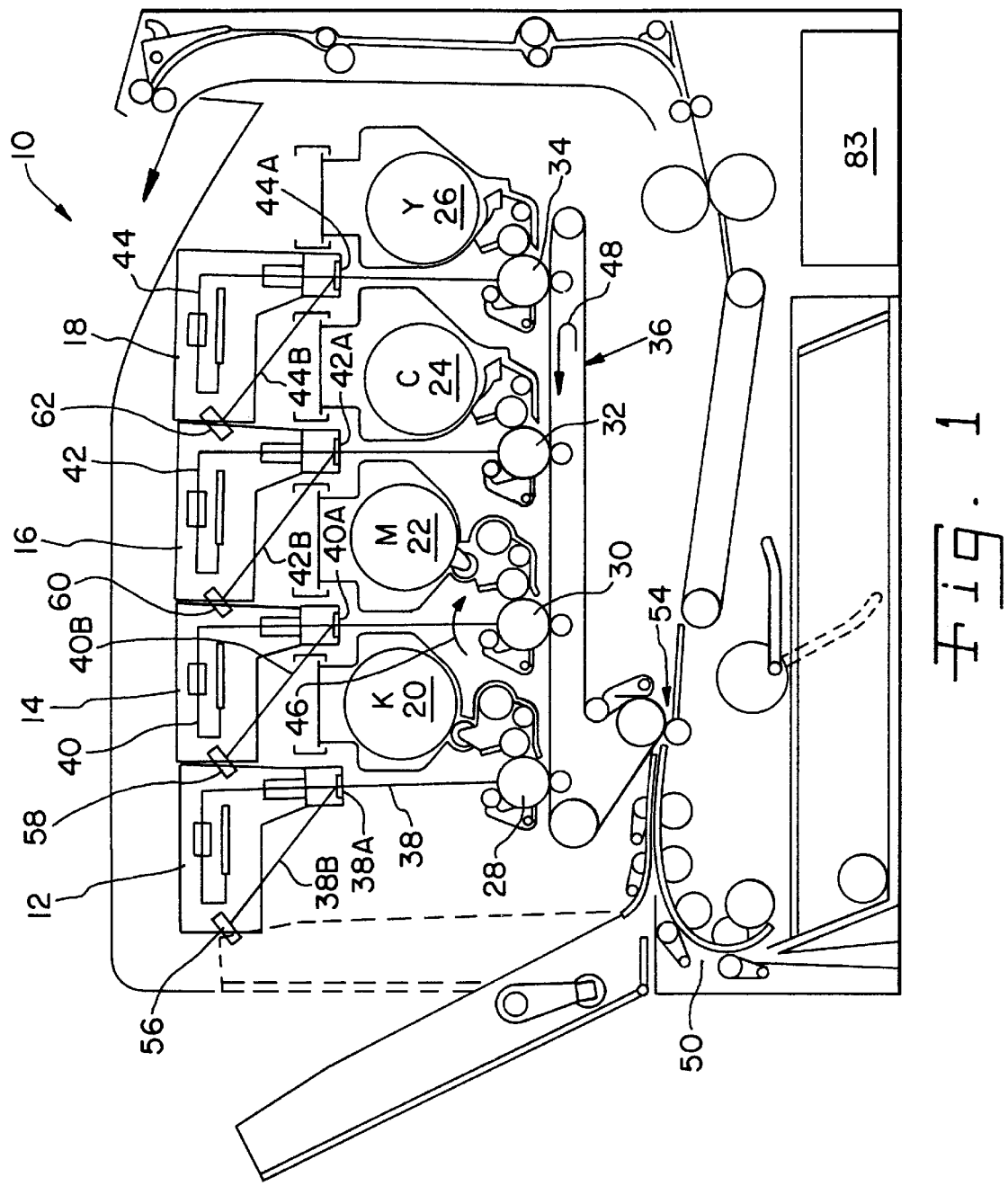
FIG. 1 is a side, sectional view of one embodiment of a multicolor laser printer in which the present invention may be used.

Referring now to the drawings and, more particularly, to FIG. 1, there is shown one embodiment of a multicolor laser printer 10 including laser print heads 12, 14, 16, 18, a black toner cartridge 20, a magenta toner cartridge 22, a cyan toner cartridge 24, a yellow toner cartridge 26, photoconductive drums 28, 30, 32, 34, and an intermediate transfer member belt 36.

Each of laser print heads 12, 14, 16 and 18 scans a respective laser beam 38, 40, 42, 44 in a scan direction, perpendicular to the plane of FIG. 1, across a respective one of photoconductive drums 28, 30, 32 and 34. Each of photoconductive drums 28, 30, 32 and 34 is negatively charged to approximately −900 volts and is subsequently discharged to a level of approximately −200 volts in the areas of its peripheral surface that are impinged by a respective one of laser beams 38, 40, 42 and 44. During each scan of a laser beam across a photoconductive drum, each of photoconductive drums 28, 30, 32 and 34 is continuously rotated, clockwise in the embodiment shown, in a process direction indicated by direction arrow 46. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −200 volts by the laser beams. As belt 36 rotates in the direction indicated by arrow 48, the toner from each of drums 28, 30, 32 and 34 is transferred to the outside surface of belt 36. As a print medium, such as paper, travels along path 50, the toner is transferred to the surface of the print medium in nip 54. The laser beam of each of print heads 12, 14, 16 and 18 reflects off of a respective one of mirrors 38A, 40A, 42A and 44A. The reflected beams 38B, 40B, 42B and 44B from respective mirrors 38A, 40A, 42A and 44A impinge upon respective position sensitive device (PSD) card assemblies 56, 58, 60 and 62, each of which is placed near the end of a scan line of the associated laser beam.

Figure 2:
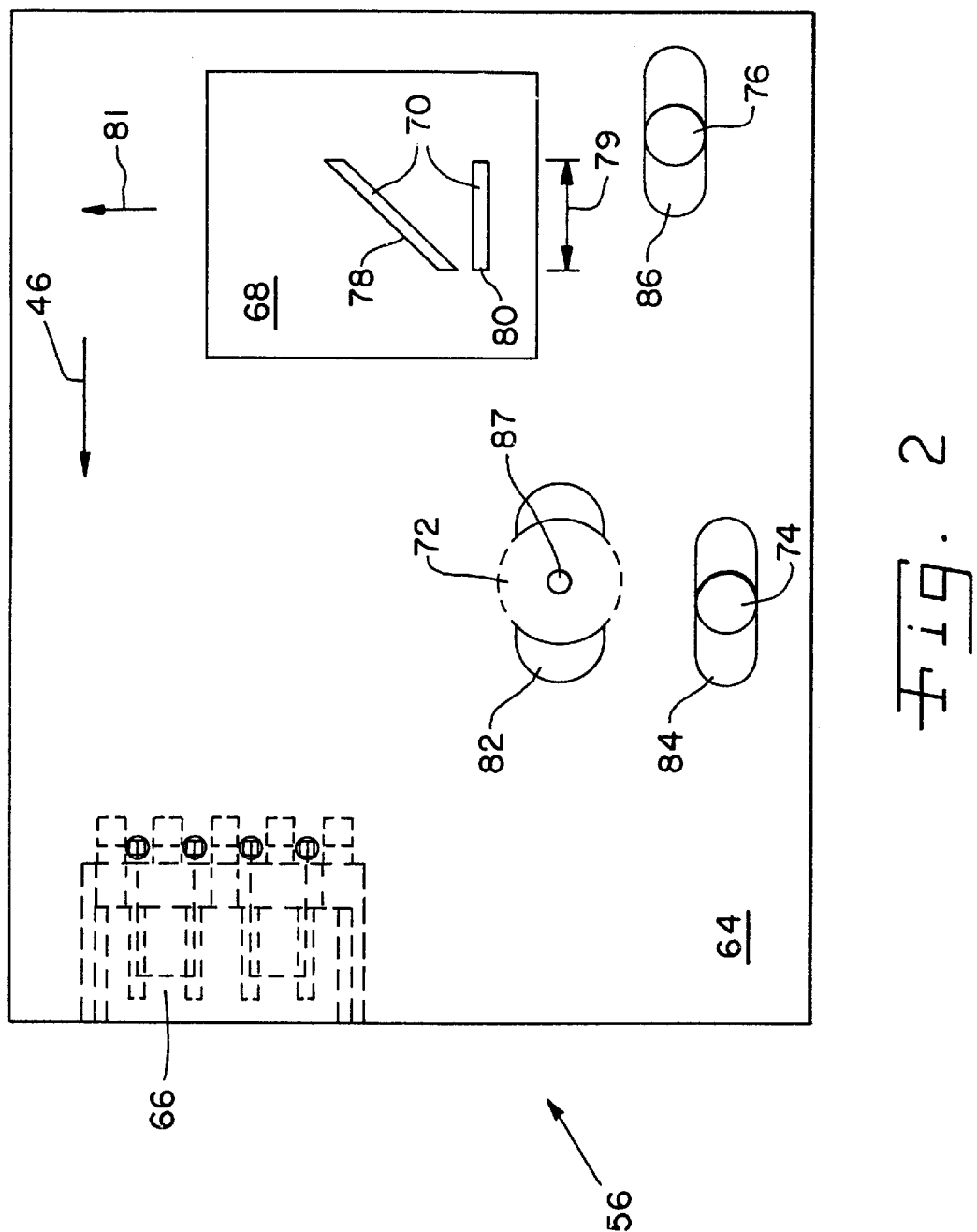
FIG. 2 is a top, schematic view of one embodiment of a position sensitive device card assembly of the present invention.

One embodiment of a PSD card assembly 56 is shown in FIG. 2 as viewed in the direction of laser beam 38B. Card assembly 56 includes a card 64, a header 66, a mask 68, a photodiode sensor 70 and a screw 72. A PSD bracket assembly includes pins 74, 76. Electrical pin connections to wires (not shown) are made at header 66, which is electrically connected to sensor 70.

Figure 3:
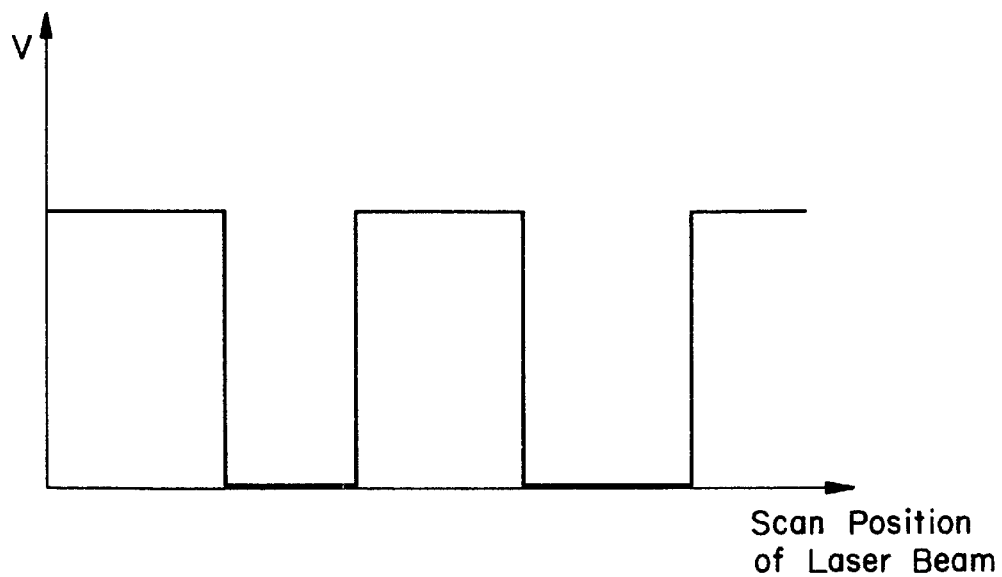
FIG. 3 is a plot of the output voltage of the sensor of FIG. 2 when a laser beam is scanned across it.

Mask 68 has nonparallel apertures or slits 78, 80 which allow light to pass therethrough. In one embodiment of a method of detecting the drift of laser printhead beam 38B in process direction 46, apertures 78, 80 are placed over photodiode sensor 70. Sensor 70 has the necessary surface area to capture any light that passes through apertures 78, 80. Apertures 78, 80 provide sensor 70 with a detection range 79 in process direction 46. Laser beam 38B scans across apertures 78, 80 in scanning direction 81. As laser beam 38B impinges upon sensor 70 through apertures 78, 80, sensor 70 produces a photocurrent signal which is converted to a voltage signal, such as shown in FIG. 3. A time duration between the leading and trailing edges of the voltage signal varies with the position of laser beam 38B along process direction 46. By measuring the time duration between the leading and trailing edges of the voltage signal, microcontroller 83 (FIG. 1) can determine the position of laser beam 38B along process direction 46.

Two techniques are possible for manufacturing a precision (five micron maximum edge straightness error) aperture. A first technique is to apply the aperture as a shadow mask directly over the surface of photodiode 70 during the manufacture of photodiode 70. This technique has submicron accuracy of the critical edges. The disadvantage of this technique is that the alignment of the aperture relative to the printhead datum is influenced by the tolerance in aligning the photodiode chip to PSD sensor board 64 (+/−0.5 degrees) and then the mounting of board 64 to the PSD bracket (+/−1 degree). An advantage is that the cost increment for adding this shadow mask is low.

A second technique is to manufacture an aperture in metal using an electro-deposition process. This process also generates submicron accuracy of the critical edges. This technique has the advantage that the alignment of apertures 78, 80 to the printhead datum can be achieved independent of the mounting of sensor 70 to board 64. A new tolerance appears for locating apertures 78, 80 to insure that all the light passing through apertures 78, 80 does indeed reach the active sensor surface. This locating requirement is not nearly as precise as locating apertures 78, 80 themselves relative to the printhead datum. This technique has the disadvantage of requiring an additional part with the associated part and assembly costs. The method of detecting the laser beam drift is simple and potentially low cost. Its disadvantage is that the larger the range that is needed to insure that the laser beam is always captured, the larger apertures 78, 80 are required to be (a 10 mm range may be needed without any adjustment of the sensor). The larger apertures 78, 80 are, the larger the photodiode area must be to capture the light passing though apertures 78, 80. Data indicates that a 3–4 mm square photodiode may be the largest practical photodiode to meet the speed of response requirements. Thus, an adjustment of sensor board 64 and the aperture subsystem relative to the PSD bracket and mirror subassembly is used to reduce the required sensor range.

A subassembly adjustment is performed on PSD sensor board 64 relative to the mirror and bracket datum. An adjustment of PSD sensor board 64 on the PSD bracket subassembly is much more cost effective than trying to adjust PSD sensor board 64 after the PSD bracket has been mounted in printer 10. The lack of space available in the machine, the negative impact upon the assembly line throughput, and field replacement difficulties are the main reasons to avoid a machine adjustment procedure. This subassembly adjustment is made with a "golden" printhead adjustment station.

Card 64 includes throughslots 82, 84 and 86. A shaft 87 of screw 72 extends through slot 82 and is attached to the PSD bracket. The PSD bracket, in turn, is fixed to the machine frame. Pins 74, 76 extend through slots 84, 86, respectively, and are attached to the fixed PSD bracket and machine frame. Since the lengths of slots 82, 84 and 86 are larger than the diameters of shaft 87 of screw 72 and pins 74, 76, card 64 can be slid back and forth as desired along process direction 46. Slots 82, 84, 86, screw 72 and pins 74, 76 coact to limit rotational movement of card 64 in the plane of FIG. 2.

The adjustment is very simple because the output of the PSD system is a time period between pulses. The time period correlates linearly with the location of beam 38B in process direction 46 relative to diagonal aperture 78. Thus, if the measured time period between pulses is less than the desired nominal time period associated with the location of laser beam 38B at the midpoint of diagonal aperture 78, sensor 70 is moved in the direction that increases this measured time period until the measured time period is equal to the nominal time period. Conversely, if the measured time period is larger than the nominal time period associated with the midpoint of diagonal aperture 78, sensor 70 is moved in the direction that decreases this measured time until the measured time period is equal to the nominal time period. In either case, once the measured time period is equal to the nominal time period, sensor 70 is locked into place by tightening screw 72 to thereby clamp down card 64. Once sensor 70 is locked into place, the tolerances associated with the PSD bracket, mirror and sensor 70 are virtually eliminated. Tolerance analysis indicates that with an adjustment of the PSD sensor/aperture system relative to the PSD bracket subsystem, a 3.5–4 mm sensor range is required to meet the remaining machine/printhead to PSD bracket mounting tolerances plus the thermal drift measurement requirements.

Figure 4:
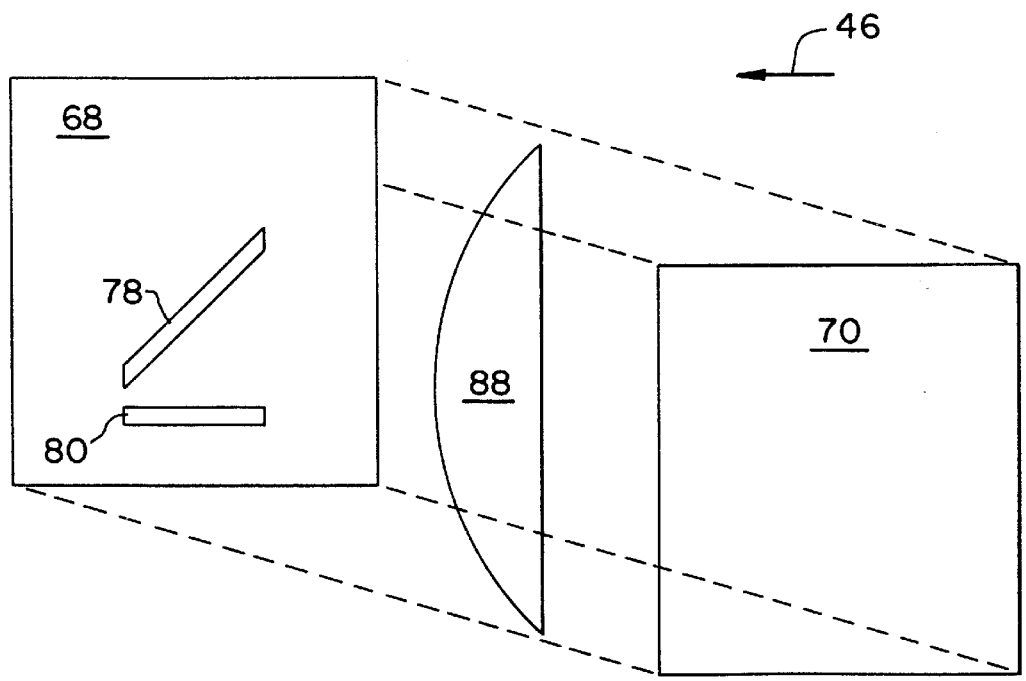
FIG. 4 is an exploded view of another embodiment in which a lens is disposed between a mask and a photodiode sensor.

In another embodiment (FIG. 4), to avoid the adjustment of PSD board 64 to the PSD bracket subassembly as described above, mask 68 with apertures 78, 80 is placed over a lens 88. Lens 88 is located between apertures 78, 80 and the 3–4 mm square photodiode 70. Apertures 78, 80 can be manufactured by either technique disclosed above. In this case of no adjustment, however, apertures 78, 80 must include the entire 10 mm required process direction range. That is, apertures 78, 80 must have a length of at least 10 mm in process direction 46. Because the speed of response of sensor 70 limits its range in process direction 46 to 3–4 mm, lens 88 must collect the light that passes through apertures 78, 80 and focus it on the active sensor area.

Sensor 70 is placed as close as possible to lens 88 in order to satisfy manufacturing space constraints, effectively placing the lens focal plane beyond the active sensor area, yet maximizing the use of the entire sensing area. Mask 68 serves as an edge detection filter for the laser beam impinging upon sensor 70. Lens 88 simply ensures that any light passing through this filter reaches sensor 70 to trigger it. Therefore, the function of lens 88 is transparent to the overall operation of the PSD.

Several considerations are reflected in the design of PSD collection lens 88. Lens 88 targets a sensing area that operates with the given system constraints, e.g., one having a 2.69 mm by 2.69 mm active area. Ease of manufacturing lens 88 is a second consideration. Lens 88 is formed of polycarbonate, an optical plastic known for its low cost, high quality, and preferred molding characteristics. A simple planoconvex spherical lens shape can be used for ease of manufacturing. The lens thickness can be held to 6.5 mm in order to maintain molding performance while balancing space constraints between lens 88 and sensor 70. The convex side of lens 88 can be placed facing apertures 78, 80 for optimum collection of the light. If the lens orientation were reversed, apertures 78, 80 could easily be mounted on the planar side, but optical performance would be significantly degraded due to total internal reflection of light near the edge of the 10 mm field. A lens diameter of 13 mm ensures that all light passing through apertures 78, 80 is collected without vignetting effects. Using a lens-to-sensor gap of 4 mm, the lens radius can be 6.95 mm. An aperture-to-lens gap of 0.75 mm can be used as an assembly consideration to avoid contact of apertures 78, 80 with the convex lens surface, which might result in surface scratches. The aperture thickness can be 0.25 mm.

Other considerations reflected in the design of PSD collection lens 88 include potential variation in the light transmission within the 10 mm field and potential variation in sensor area response. Both of these issues relate to the edge triggering sensitivity of sensor 70 and ultimately to the drift sensitivity of the PSD. While the second issue is also a consideration in the first embodiment described above, variation in light transmission could affect the trigger timing on sensor 70. Since the required light exposure on a given sensor area is essentially the product of the power illuminating that area and the time of exposure, a decrease in light transmission would require a longer exposure time to trigger sensor 70. If the light transmission variation were minimal, then error in the drift sensitivity of the PSD would be minimal.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of detecting a change in a position of a laser beam in a process direction in an electrophotographic machine, said method comprising the steps of:

providing a sensor configured to detect the position of the laser beam in the process direction, said sensor having a detection range in the process direction;

detecting the position of the laser beam in the process direction relative to the detection range of said sensor;

moving said sensor in the process direction until the laser beam is at a desired position within the detection range of said sensor; and monitoring the position of the laser beam in the process direction, said monitoring step being performed using said sensor.

2. The method of claim 1, wherein the desired position is approximately a midpoint of the detection range of said sensor.

3. The method of claim 1, comprising the further step of fixing said sensor in place after said moving step.

4. The method of claim 1, comprising the further step of mounting said sensor on a substrate, said moving step including sliding said substrate in the process direction.

5. The method of claim 1, wherein said sensor has at least one laser beam receiving area, each said receiving area having a respective first edge and a second edge, said second edge being nonparallel to said first edge.

6. The method of claim 5, wherein said detecting step includes the substeps of:

scanning the laser beam across said receiving area in a scan direction, said scan direction being substantially perpendicular to the process direction, the laser beam intersecting each of said first edge and said second edge of said receiving area during said scanning;

measuring a time period between when the laser beam intersects said first edge and when the laser beam intersects said second edge of the receiving area; and calculating the position of the laser beam in the process direction based upon said measured time period.

7. A laser beam sensor in an electrophotographic machine, said sensor being configured to detect a position of a laser beam in a process direction, said sensor having a detection range in the process direction, said sensor being audible in the process direction to a location such that the laser beam is at a desired position within the detection range of said sensor.

8. The sensor of claim 7, wherein said sensor has a laser beam receiving area with a first edge and a second edge, said first edge being opposite from and nonparallel to said second edge, said sensor being configured to transmit a signal dependent upon the laser beam intersecting said first edge and said second edge during a scan of the laser beam in a scan direction.

9. The sensor device of claim 8, wherein said laser beam receiving area includes a first photosensitive portion associated with said first edge and a second photosensitive portion associated with said second edge, said first photosensitive portion being separate from said second photosensitive portion.

10. The sensor device of claim 8, wherein said sensor includes a mask having at least one aperture defining said laser beam receiving area.

11. A laser beam sensor assembly in an electrophotographic machine, said sensor assembly comprising:
   a sensor device configured to detect a position of a laser beam in a process direction, said sensor device having a detection range in the process direction, said sensor device having one of at least one slot and at least one projection; and
   a fixed structure having an other of said at least one slot and at least one projection, said at least one slot and said at least one projection being configured to coact to allow said sensor device to slide in the process direction to a location such that the laser beam is at a desired position within the detection range of said sensor device.

12. The sensor assembly of claim 11, wherein said sensor device includes a sensor mounted on a substrate, said one of at least one slot and at least one projection comprising at least one throughslot in said substrate, said an other of said at least one slot and at least one projection comprising at least one projection extending through said at least one throughslot.

13. The sensor assembly of claim 12, further comprising a fixing device configured to fix said sensor device in place at said location.

14. The sensor assembly of claim 13, wherein said fixing device comprises a screw extending through said at least one throughslot and into said fixed structure.

15. The sensor assembly of claim 12, wherein said sensor device includes a header mounted on said substrate, said header being electrically connected to said sensor.

16. The sensor assembly of claim 11, wherein said at least one slot comprises a plurality of slots, said at least one projection comprising a plurality of projections, said slots and said projections being configured to coact to prevent rotation of said sensor device.

* * * * *